United States Patent [19]

Underwood et al.

[11] 4,250,199

[45] Feb. 10, 1981

[54] SMOKE FLAVORED HYDROPHILIC LIQUID CONCENTRATE AND PROCESS OF PRODUCING SAME

[75] Inventors: Gary L. Underwood, Whitelaw; William L. Wendorff, Manitowoc, both of Wis.

[73] Assignee: Red Arrow Products Company, Milwaukee, Wis.

[21] Appl. No.: 52,835

[22] Filed: Jun. 28, 1979

[51] Int. Cl.³ .......................... A23L 1/232; A23L 1/31
[52] U.S. Cl. ........................................ 426/533; 426/534; 426/641; 426/650; 426/652; 426/655; 426/314; 426/315; 426/429; 426/431
[58] Field of Search ................ 426/533, 650, 654, 655, 426/314, 315, 429, 431, 641, 264

[56] References Cited

U.S. PATENT DOCUMENTS

| | | | |
|---|---|---|---|
| 3,467,527 | 9/1969 | Wistreich | 426/650 X |
| 3,480,466 | 11/1969 | Hollenbeck | 426/650 X |
| 3,806,609 | 4/1974 | Goblik et al. | 426/650 |
| 3,833,743 | 9/1974 | Morse et al. | 426/650 X |
| 3,903,267 | 9/1975 | Miler et al. | 424/195 |
| 4,104,408 | 8/1978 | Chiu | 426/650 X |
| 4,112,133 | 9/1978 | Rao et al. | 426/650 |
| 4,118,519 | 10/1978 | Juhn et al. | 426/650 X |
| 4,136,206 | 1/1979 | Kulesza et al. | 426/650 X |
| 4,154,866 | 5/1979 | Dainius et al. | 426/429 X |

*Primary Examiner*—Jeanette M. Hunter
*Attorney, Agent, or Firm*—Merriam, Marshall & Bicknell

[57] ABSTRACT

A brine flavor concentrate of hydrophillic liquid containing a minimum of 2 mg/g phenolic materials extracted from smoke flavored edible oil and less than one percent titratable acidity per each 10 mg/g of phenol content. The process of smoking and curing the meat with said concentrate in brine as well as the smoked and cured meat itself is included.

25 Claims, No Drawings

SMOKE FLAVORED HYDROPHILIC LIQUID CONCENTRATE AND PROCESS OF PRODUCING SAME

This invention relates to the smoke flavoring of foods. More particularly, this invention is concerned with the production of a hydrophilic liquid brine-soluble or brine emulsifiable smoke flavoring, containing little acid.

BACKGROUND OF THE INVENTION

The use of natural smoke flavorings as a substitute for vaporous smoking is steadily increasing throughout the meat and food industry. Aqueous smoke flavorings offer the meat processors several advantages, e.g., reduced effluent from smokehouses, a more uniformly flavored product, and elimination of smoke tar carcinogens that may be present in unrefined, vaporous smoke. Several methods for producing these smoke flavorings are described in U.S. Pat. Nos. 3,106,473; 3,806,609; 3,873,741 and 3,875,314. These liquid smoke solutions may be applied to meat or food products in one of the following methods: (1) direct addition to meat emulsions or food products, (2) spraying the product with, or dipping it in, the liquid smoke, or (3) vaporizing or atomizing the liquid smoke and exposing the food or meat product to the smoky vapors or smoke aerosol produced.

Several problems arise when the previously available liquid smoke flavorings are used internally in cured meat products. Those smoke flavorings are only partially soluble in salt brines or pickling solutions and, as a result, they form polymeric solids which can clog pumping needles and cause dark specs within the cured meat product.

U.S. Pat. No. 4,112,133 discloses an aqueous smoke flavoring produced by admixing a natural liquid smoke solution with an acidulating agent and a solubilizing agent. It is stated that the tendency for solids to form in and settle from the solution is eliminated. The product has been found not to form undesirable solids in brines. However, the product, as well as other availabe smoke flavorings, will react with sodium nitrite in the brine solutions or pumping pickles, thus causing a loss of nitrite and evolution of hazardous nitrogen oxides gas before the curing brine can be pumped into the meat product.

Several modified liquid smoke flavorings have been previously developed for addition to curing brines. Chomiak and Okiewicz, Food Science and Technology Abstracts (F.S.T.A.) 9:9S 1741 (1977) disclose the addition of gelatin to the smoke solution to improve its stability in brine. Modic et al, F.S.T.A. 10:2S 208 (1978) and Prihavec and Polic, F.S.T.A. 10:2S 214 (1978) disclose a product Etol 8027 useful in brine. Etol 8027 is a smoke concentrate which uses salt as a carrier for the concentrate. These smoke solutions, however, contain substantial amounts of the organic acids, normally present in wood smoke, which lead to loss of nitrite from brine. By eliminating the acid fraction of the liquid smoke flavoring, premature loss of nitrite can be significantly reduced. By partial neutralization of the acids in liquid smoke with alkali, losses of nitrites can be reduced. However, when the pH of the liquid smoke is raised above 5.0, with alkali, the smoke flavor components are altered and the resulting flavor is objectionable.

A low acid smoke flavoring can be produced by extracting the choice smoke flavor components into an edible oil as described in U.S. Pat. No. 3,480,446. This smoke flavored edible oil has an excellent quality of smoke flavor with negligible acid content. However, it is not soluble in brine curing solutions and therefore it can not be pumped easily into cured meat products with a pumping pickle.

SUMMARY OF THE INVENTION

The product provided by the invention comprises a smoke flavor concentrate in the form of a solution or emulsion of smoke flavors in an organic hydrophilic liquid or an organic emulsifier or a mixture of two or more such materials. The product is very low in titratable acidity, indicating it is low in organic acids from natural wood smoke. It can be easily incorporated in brine and pickling solutions to smoke flavor foods, and it neither causes premature loss or reduction of nitrite content nor leads to deposition of solids in the brine or pickling solutions, or in the smoked and/or cured food product.

The smoke flavor concentrate provided by the invention is produced by extracting an edible oil solution of smoke flavors, primarily phenolic materials, with a suitable hydrophilic liquid or emulsifier which is soluble or dispersible in brine or pickling solutions. A mixture of two or more hydrophilic liquids or emulsifiers can also be used for the extraction.

Standard procedures can be used to employ the novel product in the smoking of foodstuffs, whether or not a brine or pickling solution is used.

DETAILED DESCRIPTION OF THE INVENTION

The smoke flavor concentrate provided by the invention is broadly producible by extracting the phenolic smoke flavor components from a smoke flavored edible oil by contacting the oil with a suitable organic hydrophilic liquid or organic emulsifier and then separating the two immiscible phases. Organic acids present in natural aqueous wood smoke flavorings, which are undesirable in some applications, are substantially reduced by producing the flavoring from a smoke flavored oil which inherently contains little acid. Organic acids in smoke are generally measured by titratable acidity but total titratable acidity does include a small amount of phenolic acidity. The process of the invention is a concentrating one in which much smoke flavor, as measured by the primary flavor constituents, phenols, is transferred into a small amount of extractant.

Although the smoke flavored edible oil starting material can be produced by directly contacting an edible oil with natural wood smoke, it is preferred to start with a smoke flavored edible oil produced according to Hollenbeck U.S. Pat. No. 3,480,446. The Hollenbeck patent discloses producing a smoke flavored edible oil by contacting an aqueous solution of wood smoke flavors with an edible oil. The resulting smoke flavored edible oil is a particularly useful starting material in the subject invention since it contains very little of the organic acids found in the aqueous solution of smoke flavors.

Specific smoke flavored edible oils which can be used are smoke flavored animal and vegetable oils such as soybean oil, peanut oil, lard oil, corn oil, cottonseed oil, olive oil, palm oil, coconut oil, safflower oil, sunflower oil, sesame seed oil, tallow, lard, and butterfat, as well as various triglycerides and fatty acids, all of which are considered edible oils within the meaning of this invention. The edible oil can be a liquid or solid at room temperature.

The smoke flavored edible oil used as the starting material can contain any suitable amount of smoky materials measured as phenolic materials, but it should contain a minimum of 1 mg/g, and more suitably about 5 to 20 mg/g, of phenolic materials.

There are many hydrophilic liquids or emulsifiers suitable for use in producing the smoke flavor concentrate of the invention but those most suitable are nonionic. In general, though, one should be selected which is acceptable in foods and has good solubility or dispersibility in a brine or pickling solution.

Representative of hydrophilic liquids or emulsifiers which can be used are:
 1. Glycols:
    Propylene glycol
    1,3-Butylene glycol
 2. Polyglycerol esters:
    Octaglycerol monooleate
    Octaglycerol monostearate
 3. Polyethylene glycol esters between 200 to 9500 molecular weight and having an HLB value of 8 or greater:
    Polyethylene glycol monostearate
    Polyethylene glycol monooleate
 4. Polyoxyethylene sorbitan esters:
    Polyoxyethylene (20) sorbitan monolaurate
    Polyoxyethylene (20) sorbitan monooleate
    Polyoxyethylene (5) sorbitan monooleate
    Polyoxyethylene (20) sorbitan trioleate
    Polyoxyethylene (20) sorbitan monopalmitate
    Polyoxyethylene (20) sorbitan monostearate
    Polyoxyethylene (20) sorbitan tristearate In general, it is advisable to employ a hydrophilic liquid or emulsifier which has an hydrophile-lipophile balance (HLB) of about 8 or higher. Hydrophilic liquids or emulsifiers having lower HLB values are poorly soluble, or do not disperse well, in brine and accordingly do not provide all of the advantages achievable by use of the invention. Emulsifiers having lower HLB values are also miscible with the edible oil and cannot be easily separated from the extraction process.

Although it is generally advisable to use a hydrophilic liquid or emulsifier having a very low water content, or one which is essentially water free, a useful product can be obtained by having a substantial amount of water admixed with the hydrophilic liquid or emulsifier. Usually, however, it is desirable to have the water content no greater than 50%, and generally no greater than 25%, on a weight basis in the admixture because the phenolic content in the resulting smoke flavor concentrate decreases with increasing water content.

Extraction of the smoke flavored edible oil is readily effected by thoroughly intermixing it with the selected hydrophilic liquid or emulsifier. If either of the materials is a solid or semi-solid at room temperature, it can be heated to achieve a suitably liquid state for the extraction. The extraction, in general, is efficiently performed at ambient temperature or a moderately elevated temperature. The mixture can be maintained in dispersed condition long enough for a substantial amount of the phenolic materials to migrate from the oil into the hydrophilic liquid or emulsifier. The mixture can then be divided into layers by standing, and the desired smoke flavor concentrate layer of the invention separated by drawing it off from the edible oil layer. Separation can also be achieved by centrifugation. The extraction can be repeated with a fresh aliquot of hydrophilic liquid or emulsifier until most, or nearly all, of the smoky phenolic materials are removed from the edible oil.

Although not narrowly critical, the extraction can be effected using in the range of about 1 part by weight of hydrophilic liquid or emulsifier to about 0.1 to 25 parts by weight of smoke flavored edible oil. The preferred range is about 1 part by weight of hydrophilic liquid or emulsifier to about 1 to 5 parts by weight of smoke flavored edible oil. A sequential extraction process can be used to produce a smoke flavor concentrate containing 50–60 mg of phenols per gram of concentrate by using a single aliquot of emulsifier to extract 3 or 4 aliquots of smoke flavored edible oil. Conversely, a single aliquot of smoke flavored oil can be extracted sequentially with several aliquots of hydrophilic liquid or emulsifier.

After the extraction is completed, the smoke flavor concentrate can be decanted or centrifuged to remove any edible oil dispersed in the product.

The phenolic level in the final smoke flavor concentrate will depend to a considerable extent on the phenolic content of the smoke flavored edible oil, the specific hydrophilic liquid or emulsifier used, the ratio of smoke flavored edible oil to hydrophilic liquid or emulsifier used in the extraction, and the number of extractions. A minimum phenolic content of 2 mg/g is probably acceptable although phenolic contents of from about 10 to 60 mg/g of final smoke flavor concentrate can be obtained readily.

The total titratable acidity of the product will increase with increasing phenolic level of the extract. However, it is better to have a more concentrated extract since, with an increase in phenolic level, a proportionately lower increase in titratable acidity is experienced. With a more concentrated extract, less extract need be used to achieve the same flavor as a less concentrated extract so that less acid would be added. However, even with an increase in titratable acidity, the amount of organic acids in the smoke flavor concentrate will generally be less than one percent for each 10 mg/g of phenols in the concentrate. This very high ratio of phenols to acid is one of the characteristics which distinguishes this product from those previously available.

One way in which the titratable acidity in the smoke flavor concentrate can be minimized is to first extract the smoke flavored edible oil with water, and to thereafter extract the oil with a hydrophilic liquid or emulsifier. In this way, the titratable acidity in the smoke flavor concentrate is reduced with very little reduction in phenols.

The resulting smoke flavor concentrate has very desirable flavor characteristics, a limited amount of acid and a high content of smoke flavor phenols. It is useful in aqueous applications, especially incorporation into curing brines and pumping pickles for smoke flavoring cured meat products, e.g., hams and bacon. It also provides a way of incorporating oil-soluble smoke flavors into food systems, whether or not aqueous based. It can, in addition, be used for smoke flavoring brine-salted cheeses and it can be added to flavors and spice blends.

The smoke flavor concentrate produced as described has the following advantages or beneficial properties which make it an especially useful product:
 1. The smoke flavor components are easily dispersible in salt brines or curing solutions.

2. Only the better flavored, oil-soluble components of smoke are present in the smoke flavor concentrate.
3. The smoke flavor concentrate is essentially free of benzopyrene and similar carcinogenic compounds. This is because the undesirable carcinogenic hydrocarbons from vaporous smoke are removed prior to production of the smoke flavored oil.
4. By obtaining the smoke flavor components from the smoke flavored oil, one is able to produce a brine-soluble smoke flavoring which is essentially free of the acid fraction of smoke.
5. The smoke flavor concentrate is stable in brine solutions containing nitrite and will eliminate premature loss of nitrite and evolution of nitrogen oxides.
6. The smoke flavor concentrate has good antioxidant and antimicrobial properties.

The following examples are presented to illustrate the invention.

EXAMPLE 1

To 15 grams of polyoxyethylene(20)sorbitan monooleate (polysorbate 80) was added 100 grams of smoke flavored soybean oil (U.S. Pat. No. 3,480,446) with a phenolic concentration of 7.9 mg/g. The two substances were vigorously intermixed for 30 minutes. The mixture was then centrifuged in a table top centrifuge for ten minutes. Two distinct phases were present after centrifugation, an upper, light amber phase and a lower, dark, reddish brown phase. Subsequent analysis of the two phases revealed that the upper, oil phase had a phenolic content of 4.1 mg/g while the lower polysorbate 80 phase phenolic concentration was 27.9 mg/g.

EXAMPLE 2

Samples of smoke flavored soybean oil (U.S. Pat. No. 3,480,446) with a phenolic concentration of 7.9 mg/g were mixed with the emulsifier, polysorbate 80, for 15 minutes at the weight ratios listed below. In each case two phases were separated by centrifugation and the lower emulsifier phase was analyzed for phenolic content.

| Oil-to-Emulsifier Ratio | Phenols in Emulsifier mg/g |
|---|---|
| 1:1 | 5.5 |
| 2:1 | 10.5 |
| 3:1 | 15.2 |
| 5:1 | 20.6 |
| 10:1 | 31.2 |
| 15:1 | 39.4 |
| 20:1 | 39.7 |
| 25:1 | 39.9 |

EXAMPLE 3

Five hundred grams of smoke flavored soybean oil (U.S. Pat. No. 3,480,446) with a phenolic concentration of 8.1 mg/g were mixed for 15 minutes with 50 grams of the emulsifier, polysorbate 80. The two phases were allowed to separate by standing overnight in a separatory funnel. A sample of each layer was taken and the lower, emulsifier phase was separated into a tared beaker. The extract was then mixed again with a fresh aliquot of the same smoke flavored oil at the same, 10:1 weight ratio as before and an extract was again isolated. The procedure was repeated twice more so as to obtain a total of four successive extract samples. The phenolic contents of the extracts and respective spent oils were found to be as follows:

| Extractions | Extract Phenols mg/g | Spent Oil Phenols mg/g |
|---|---|---|
| 1st. | 32.6 | 5.8 |
| 2nd. | 46.8 | 6.7 |
| 3rd. | 55.8 | 7.4 |
| 4th. | 57.5 | 7.7 |

EXAMPLE 4

The titratable acidity, expressed as grams of acetic acid per 100 g of sample (%W/W) of several extracts prepared as in Example 2 was determined by titration of the extracts with a standard 0.1 N sodium hydroxide solution and the results were as follows:

| Phenols mg/g | Titratable Acidity (%W/W) |
|---|---|
| 10.4 | 0.73 |
| 20.8 | 1.70 |
| 30.4 | 2.68 |
| 39.4 | 3.29 |

EXAMPLE 5

Commercial aqueous smoke flavorings were compared with the most concentrated extract of Example 3 to demonstrate the relationship between acid and phenolic content. To obtain a desired smoke flavor level in a product to which any of these flavorings would be added, the same quantity of phenols must be added regardless of the quantity of other components concomitantly added. Hence, the grams of titratable acid present in the quantity of each extract necessary to obtain 1.0 g of phenols (g acid/g phenols) was determined.

| Flavoring | Titratable Acidity (%W/W) | Phenols mg/g | g Acid/ g Phenols |
|---|---|---|---|
| CharSol C-10 (1) | 10.7 | 14.4 | 7.4 |
| CharSol C-6 (1) | 6.5 | 8.1 | 8.0 |
| Example 3 Extract | 4.98 | 57.5 | 0.87 |

(1) Red Arrow Products Company (trademarks; products made according to process disclosed in U.S. Pat. No. 3,106,473).

EXAMPLE 6

One hundred gram aliquots of smoke flavored soybean oil (U.S. Pat. No. 3,480,446) with a phenolic content of 8.1 mg/g was extracted with 20 g aliquots of the emulsifier, polysorbate 80, at several temperatures. The results were as follows:

| Extraction Temperature (°C.) | Phenols in Extract (mg/g) | Titratable Acidity (%W/W) |
|---|---|---|
| 22 | 20.9 | 1.4 |
| 30 | 23.2 | 1.4 |
| 45 | 21.8 | 1.4 |
| 60 | 21.9 | 1.3 |
| 75 | 20.7 | 1.3 |

EXAMPLE 7

To each of three 90 g samples of Velveeta (trademark of Kraft Inc.) cheese spread was added either smoke flavored soybean oil (U.S. Pat. No. 3,480,446) with a phenolic concentration of 8.4 mg/g, or an extract prepared as in Example 2 from the same oil. In this way, three samples were prepared, two of which contained the same flavoring, leaving one odd sample. The quantity of each flavoring added was such that a final phenolic concentration in all Velveeta samples was 4.0 mg/100 g. Ten grams of water was added to facilitate mixing. The samples were heated in a water bath and mixed until homogeneous. Five panelists were asked to taste the samples and indicate which one was different from the other two. None of the panelists picked the odd sample.

EXAMPLE 8

One hundred gram aliquots of smoke flavored soybean oil (U.S. Pat. No. 3,480,446) with a phenolic content of 8.1 mg/g were extracted as in Example 2 with 20 g samples of emulsifiers from the classes: polyoxyethylene sorbitan fatty acid esters (polysorbate 80, polysorbate 20, trioleate ester), polyethylene glycols (Durpeg 400 MO), polyglycerol esters (Santone 8-1-0), and glycols (propylene glycol). Phenol and acid concentrations measured in each of the extracts were as follows:

| Emulsifier | Phenols (mg/g) | Titratable Acidity (% W/W) | Emulsifier HLB Value |
|---|---|---|---|
| Polysorbate 80 (A) | 23.1 | 1.5 | 15.0 |
| Polysorbate 20 (B) | 25.4 | 1.5 | 16.7 |
| Trioleate Ester (C) | 20.0 | 1.2 | 11.0 |
| Durpeg 400 MO (D) | 26.1 | 2.5 | 11.4 |
| Santone 8-1-0 (E) | 12.0 | 0.3 | 13.0 |
| Propylene Glycol | 15.3 | 1.5 | 20.0 |

(A) Polyoxyethylene (20) sorbitan monooleate
(B) Polyoxyethylene (20) sorbitan monolaurate
(C) Polyoxyethylene (20) sorbitan trioleate
(D) Polyethylene glycol (400) monooleate
(E) Octaglycerol monooleate (trademarks of Durkee Industrial Foods Group/SCM Corp.).

EXAMPLE 9

A curing pickle was made by mixing the following:

| Components | % (W/W) | |
|---|---|---|
| Sodium Chloride | 11.0 | |
| Sucrose | 2.3 | |
| Sodium Erythorbate | 0.5 | |
| Sodium Nitrite | 0.125 | (1250 ppm) |
| Water | 86.075 | |

The various smoke flavorings of Example 5 were added to aliquots of this pickle to achieve a phenolic concentration such that if the solution were used in curing meat, a desirable level of smoke flavor would be present. The phenolic concentration used was 0.020 g/100 g. The pH and nitrite content of each sample after 1 hour were measured.

| Flavoring | pH | Nitrite Concentration (ppm) |
|---|---|---|
| Control | 6.7 | 1250 |
| CharSol C-10 | 5.0 | 670 |
| CharSol C-6 | 5.0 | 590 |
| Example 3 Extract | 5.8 | 1300 |

EXAMPLE 10

A brine was prepared with the following composition by weight:

| Components | Percent |
|---|---|
| Sodium Chloride | 11.0 |
| Sucrose | 2.3 |
| Sodium Nitrite | 0.125 |
| Sodium Pyrophosphate | 1.0 |
| Sodium Erythorbate | 0.5 |
| Water | 85.075 |

Two hams were injected to 110% of their original weight with the above brine. A third ham was injected with the same brine to which was added a polysorbate 80 extract of smoke flavored oil, with a phenolic concentration of 46 mg/g, to achieve a brine concentration of phenols of 0.035 g/100 g. The three hams were held at 35° F. for three days in a cover pickle solution having the following composition by weight:

| Components | Percent |
|---|---|
| Sodium Chloride | 11.0 |
| Sodium Nitrite | 0.125 |
| Sodium Erythorbate | 0.5 |
| Water | 88.375 |

After the three-day soak the hams were removed and one of the two which did not contain any flavoring was dipped in a commercial aqueous solution of natural wood smoke flavors sold as CharSol C-6 (Red Arrow Products Company) for 1 minute. The hams were then cooked at 165° F. dry bulb and 120°. wet bulb (29% relative humidity) until their internal temperature reached 140° F. Cooking was continued at 175° F. dry bulb and 130° F. wet bulb until their internal temperature was 155° F. The hams were then cooled to 35° F. and kept at that temperature for 2 days. The hams were sliced and evaluated for smoke flavor characteristics.

The ham with no smoke flavor was bland. The ham which had been dipped had acceptable flavor in portions containing an outer section which had been in contact with the flavoring, but inner portions were bland. The ham to which the polysorbate 80 extract had been added to the brine had desirable flavor regardless of the location from which the portion was taken.

EXAMPLE 11

To 200 g aliquots of smoke flavored soybean oil which had a phenolic concentration of 8.5 mg/g were added 40 g aliquots of extractant which contained both polysorbate 80 and water in varying proportions. The samples were mixed vigorously for 10 minutes, the phases were allowed to separate, and in each case the aqueous phase was removed. Subsequent analyses revealed the following:

| Extractant | | Phenols mg/g | Titratable Acidity (% W/W) |
|---|---|---|---|
| % (W/W) Polysorbate 80 | % (W/W) Water | | |
| 100 | 0 | 18.9 | 1.3 |
| 90 | 10 | 17.2 | 1.3 |
| 75 | 25 | 14.2 | 1.3 |
| 50 | 50 | 9.9 | 1.4 |
| 25 | 75 | 6.8 | 1.3 |
| 10 | 90 | 4.0 | 1.4 |
| 0 | 100 | 1.7 | 1.5 |

The data indicate that the extraction process which occurs is not simply an aqueous extraction from the oil. There is an affinity of the phenols for the emulsifier which exists and when the amount of emulsifier present is reduced, by dilution with water, a proportionately lower concentration of phenols in the extract results. On the other hand, titratable acidity is not affected by the quantity of emulsifier present indicating acids are extracted equally as efficiently by both the emulsifier and water. Incorporation of water in the extraction process is detrimental because lower concentrations of phenols in the extract result when more water is added, while the titratable acidity of the extract remains unchanged. Thus, as more water is added, titratable acidity per unit of phenols increases, which is contrary to one of the main advantages of this invention.

EXAMPLE 12

The oil from Example 11 which had been extracted with 0% polysorbate 80 in the extractant was further extracted with 40 g of polysorbate 80. After separation, the extract was found to have a phenol concentration of 16.4 mg/g with a titratable acidity of 0.57% (W/W). This shows that a water wash before extraction with polysorbate 80 can be used to remove a significant portion of the acidity. Some reduction in phenols is experienced (see 100% polysorbate 80 extract, Example 11). The net result is an extract which is less concentrated, but is better from the standpoint of titratable acidity per unit of phenols.

This detailed description has been given only for clearness of understanding, and no unnecessary limitations should be understood therefrom, as modifications will be obvious to those skilled in the art.

What is claimed is:

1. A smoke flavor concentrate soluble in brine comprising a hydrophilic liquid selected from the group consisting of glycols, polyglycerol esters, polyethylene glycol esters and polyoxyethylene sorbitan esters, containing smoke flavor phenolic materials which have been extracted from an edible smoke flavored oil, said concentrate containing a minimum of 2 mg/g of phenolic materials and less than one percent by weight of titratable acidity per each 10 mg/g of phenol content.

2. A smoke flavor concentrate according to claim 1 in which the hydrophilic liquid has an HLB of at least 8.

3. A smoke flavor concentrate according to claim 1 essentially free of water.

4. A smoke flavor concentrate according to claim 1 containing no more than about 25% water by weight.

5. A smoke flavor concentrate according to claim 2 in which the hydrophilic liquid is a polyoxyethylene sorbitan ester having an HLB greater than 10.

6. A smoke flavor concentrate according to claim 1 in which the hydrophilic liquid is polyoxyethylene (20) sorbitan monooleate.

7. A smoke flavor concentrate according to claim 1 in which the hydrophilic liquid is polyoxyethylene (20) sorbitan monolaurate.

8. A smoke flavor concentrate according to claim 1 in which the hydrophilic liquid is polyoxyethylene (20) sorbitan trioleate.

9. A smoke flavor concentrate according to claim 1 in which the hydrophilic liquid is polyethylene glycol (400) monooleate.

10. A smoke flavor concentrate according to claim 1 in which the hydrophilic liquid is octaglycerol monooleate.

11. A process which comprises contacting a smoke flavored edible oil containing at least 1 mg/g of phenolic materials with a hydrophilic liquid selected from the group consisting of glycols, polyglycol esters, polyethylene glycol esters and polyoxyethylene sorbitan esters, having limited oil solubility and being acceptable in foods, to extract the smoke flavor phenolic materials from the oil into the hydrophilic liquid, and separating the now smoke flavor brine soluble hydrophilic liquid, containing at least 2 mg of phenolic materials per gram of solution, from the edible oil.

12. A process according to claim 11 in which about 1 part by weight of hydrophilic liquid per 0.1 to 25 parts by weight of smoke flavored edible oil is used in the extraction.

13. A process according to claim 11 in which the final smoke flavor hydrophilic liquid contains at least 10 mg of phenolic material per each one percent of titratable organic acids in the product.

14. A process according to claim 11 in which the hydrophilic liquid is essentially free of water.

15. A process according to claim 11 in which the hydrophilic liquid is polyoxyethylene (20) sorbitan monooleate.

16. A process according to claim 11 in which the hydrophilic liquid is polyoxyethylene (20) sorbitan monolaurate.

17. A process according to claim 11 in which the hydrophilic liquid is polyoxyethylene (20) sorbitan trioleate.

18. A process according to claim 11 in which the hydrophilic liquid is polyethylene glycol (400) monooleate.

19. A process according to claim 11 in which the hydrophilic liquid is octaglycerol monooleate.

20. A process according to claim 11 in which the hydrophilic liquid is soluble in brine.

21. A process according to claim 11 in which the hydrophilic liquid contains no more than about 25% water by weight.

22. A method of smoking and curing a meat which comprises contacting meat with a curing brine solution containing sodium nitrite, sodium chloride and a hydrophilic liquid, selected from the group consisting of glycols, polyglycol esters, polyethylene glycol esters and polyoxyethylene sorbitan esters, said hydrophilic liquid containing therein a minimum of 2 mg/g of phenolic materials which have been extracted from edible smoke flavored oil and less than one percent by weight of titratable acidity per each mg/g of phenolic content, said contacting being for a period of time sufficient to smoke and cure said meat.

23. A method according to claim 22 in which all of the smoke flavor phenolic materials are soluble in an edible oil.

24. A smoked and cured meat produced according to the method of claim 22.

25. A smoked and cured meat according to claim 24 in which all of the smoke flavor phenolic materials are soluble in an edible oil.

* * * * *